June 4, 1935.  W. H. HARLESS  2,003,361
PARKING DEVICE FOR AUTOMOBILES
Original Filed Jan. 19, 1932  2 Sheets-Sheet 1
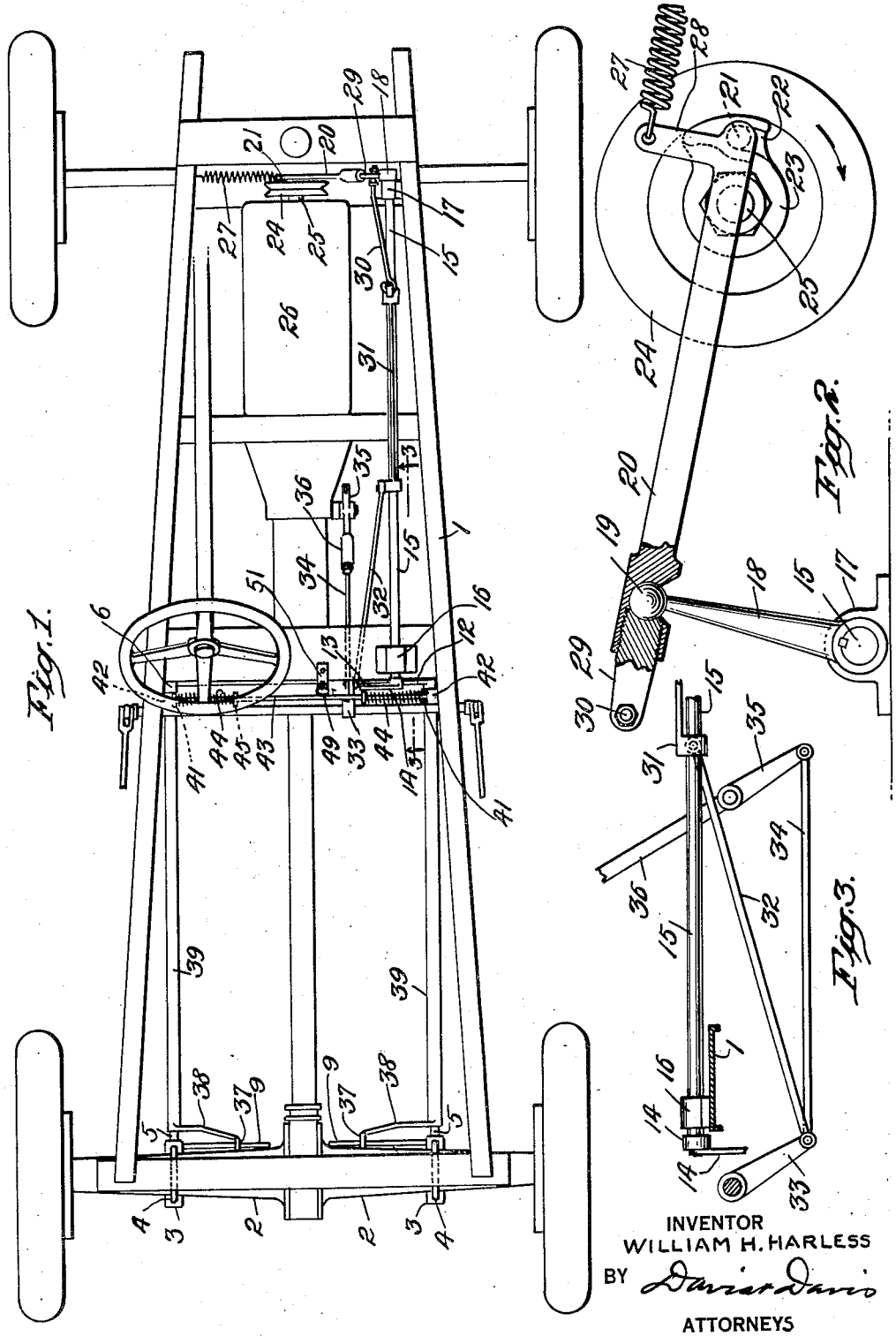
INVENTOR
WILLIAM H. HARLESS
BY
ATTORNEYS June 4, 1935. W. H. HARLESS 2,003,361
PARKING DEVICE FOR AUTOMOBILES
Original Filed Jan. 19, 1932 2 Sheets-Sheet 2
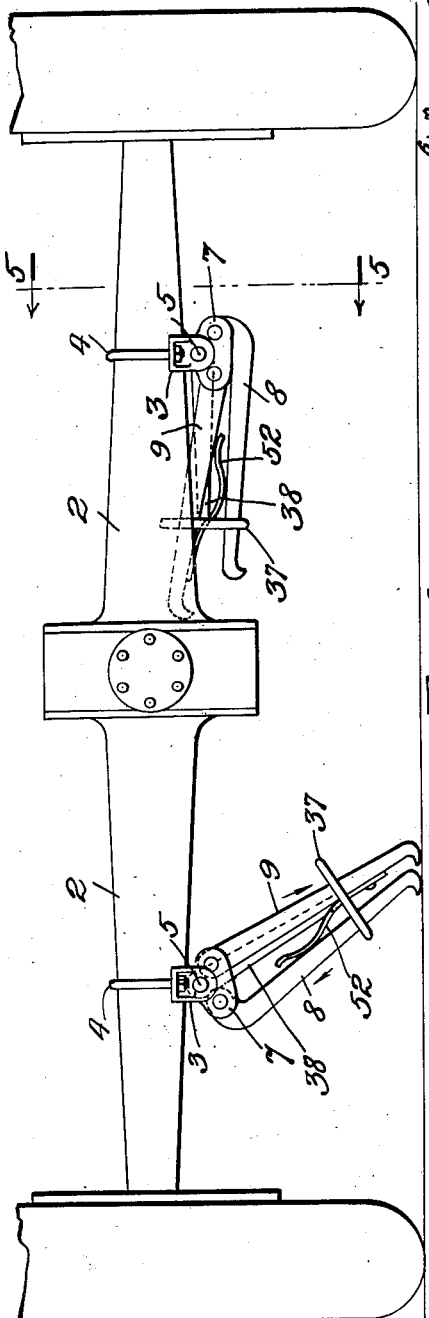
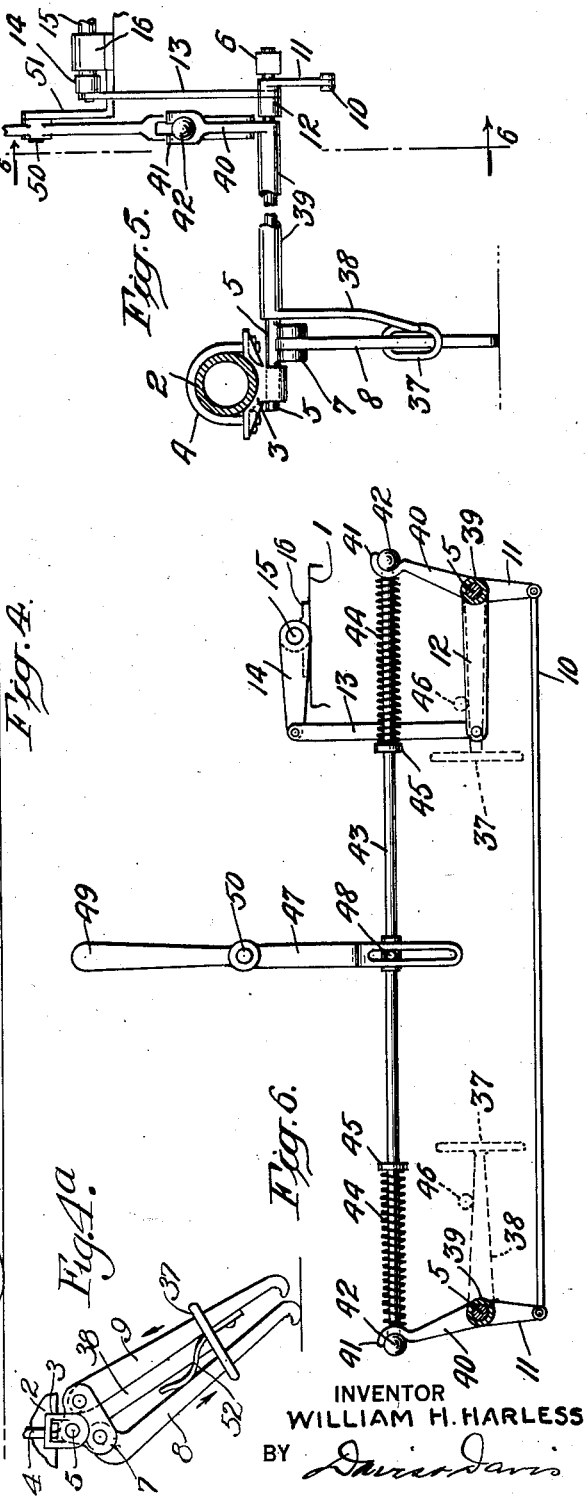
INVENTOR
WILLIAM H. HARLESS
BY
ATTORNEYS Patented June 4, 1935

2,003,361

UNITED STATES PATENT OFFICE 2,003,361

PARKING DEVICE FOR AUTOMOBILES

William H. Harless, Patchogue, N. Y.

Application January 19, 1932, Serial No. 587,521
Renewed October 27, 1934

7 Claims. (Cl. 180—1)

This improvement relates to a novel parking device for automobiles, which is adapted to be operated when coming up to the curb to move the rear end of the car inward toward the curb for close parking or to get out when the space is limited.

Where cars are parked close together along the sides of a street it is often difficult to get the car in close to the curb in the limited space available without considerable manipulation, and it is likewise difficult, if not impossible, at times, to get the car out of such a close parking space.

Various types of devices have been proposed, employing wheels, gears and the like, but such devices are expensive and difficult to attach to the car, and when attached are heavy and clumsy and objectionably conspicuous.

The object of the present improvement is to provide a light-weight device that may be attached to the car and operated from the engine entirely under the control of the driver, and when not in use may be withdrawn from operative position and held up under the car out of the way.

In the present improvement the novel arrangement comprises a pair of walking devices secured on the under side of the car, preferably on the rear axle housing, and adapted to be vibrated by power from the engine to move the rear of the car toward or from the curb. The walking devices are adapted to be connected with the engine when the emergency brake lever is operated, and the rear end of the car is moved toward or away from the curb by operating a hand lever toward or from the curb, the hand lever being arranged to hold the proper walking device in contact with the pavement.

One form and arrangement for illustrating the improvement is shown in the accompanying drawings, in which Fig. 1 is a plan view of an automobile chassis with the parking devices attached;

Fig. 2 is an enlarged detail of the rocking link;

Fig. 3 is a detail of the link connection with the emergency brake;

Fig. 4 is a view from the rear of the rear axle housing, upon which the walking devices are mounted;

Fig 4a is a detail rear view of one of the walking devices showing the operation thereof;

Fig. 5 is a broken-away detail of the operating connections; and

Fig. 6 is a detail view of the hand lever connections for placing and holding the walking devices in operative position against the pavement.

Referring to the drawings, the chassis 1 represents any usual or preferred type of automobile frame, upon which the device may be mounted, the walking devices being preferably mounted upon the rear axle housing 2. For this purpose, as will be seen in Figs. 4 and 5, two bearings 3 are secured by means of yokes 4 to the housing 2 of the rear axle, on each side of the center thereof. Mounted in the bearings 3 and extending forwardly of the car are rock shafts 5, the front ends of which are supported in bearings 6 suspended from the chassis in any suitable or preferred manner.

The rear ends of the shafts 5 adjacent the bearings 3 are provided with radial arms 7 extending in opposite directions, to which the upper ends of walking bars 8 and 9 are pivotally secured, as indicated in Figs. 4 and 5. Said radial arms are fixed to the shafts to rock therewith. As will be seen in Fig. 1, the rock shafts 5 extend forward on each side of the center of the chassis to a point near the middle of the car where the bearings 6 are located, and are connected to rock in unison by a cross link 10 connected to crank arms 11 mounted on the respective rock shafts 5 and secured thereto.

In order to rock the shafts 5 and thereby longitudinally reciprocate or vibrate the walking bars 8 and 9, it is preferable to connect the rock shafts 5 with the engine so that the power of the engine may be utilized. Accordingly one of the shafts 5 is provided, as shown in Fig. 6, with a rock arm 12 connected by a link 13 to another rock arm 14 on a shaft 15 located above the chassis frame 1, this arrangement being preferably provided for obtaining proper direct connections with some part of the rotating mechanism of the engine.

The shaft 15, as will be seen in Fig. 1, extends forward to the front end of the chassis and is supported in bearings 16 and 17. The rock shaft 15 is provided at its front end with an upwardly extending rock arm 18 preferably terminating at its upper end with a ball 19, to which a link 20 is secured for universal movement. The link 20 extends across the front of the machine, as will be seen in Figs. 1 and 2, and is provided with a laterally and rearwardly extending pin 21 which is adapted to engage a slot 22 in a crank plate 23 secured to and rotating with the usual fan pulley 24 mounted on the front end of the shaft 25 of the engine 26.

In order to hold the link 20 and particularly the pin 21 in proper resilient engagement with the crank plate slot 22, a spring 27 is secured to an arm 28 on the link 20 and connected to the chassis, substantially as shown in Fig. 1.

The ball 19 and socket connection with the link 20 enables the pin 21 to be moved out of the field of the slot 22 in the crank plate 23, to disconnect the device from the engine which, when connected as previously explained, is adapted to rock the shaft 15 through the rock arm 18.

In order to control the operation of the device by the engine the link 20 is preferably provided with an arm 29 extending outward from the ball end 19, as shown in Fig. 2, this arm being connected by means of a link 30 (Fig. 1), with a slide rod 31 held by collars to slide longitudinally of the rock shaft 15. This slide rod 31, as will be seen in Fig. 3, is connected at its rear end by means of a link 32 with an intermediate crank arm 33 which, by means of another link 34, is connected with an arm 35 extending downward from the emergency brake lever 36. It will be seen that by this arrangement when the emergency brake lever 36 is drawn rearward to put on the emergency brakes the slide 31 is moved forward and the link 30 will rotate the link 20 on the ball 19 and throw the pin 21 into the path of the rotating crank slot 22, the result being that the shaft 15 will be rapidly rocked by the power of the engine.

In this manner the walking bars 8 and 9 of both walking devices are vibrated longitudinally, and if one of the pairs of walking bars is brought into contact with the pavement the rocking of shaft 5 will alternately thrust the bars 8 and 9 against the pavement and move the rear of the car either toward the curb or away from it, according to which pair of walking devices is brought into operation.

In order to control the position of the walking devices each pair of thrust bars 8 and 9 is preferably mounted in a frame or loop 37, connected with a radius arm 38 pivotally mounted on the respective rock shafts 5. In the present improvement the radius arms 38 are secured to the rear ends of tubes 39 telescoping over the respective shafts 5 and extending substantially the full lengths of the shafts, as indicated in Fig. 5.

The forward ends of the tubes 39 are preferably provided with upwardly extending rock arms 40 having their upper ends slotted and formed with sockets 41, in which the enlarged ball ends 42 of a connecting rod 43 are mounted. Long compression springs 44 are preferably mounted at the ends of the rod 43 and held in place by suitable collars 45. These springs engage the ends 41 of the rock levers 40 and resiliently hold the radius arms 38 substantially horizontal as indicated by dotted lines in Fig. 6. The upward limit of movement of the walking devices is preferably determined by suitable stops such as indicated at 46.

By moving the rod 43 in one direction or the other one of the springs 44 will be compressed without moving the corresponding radius arm 38, while the opposite radius arm will be moved by the ball end 42 downward into substantially the position shown at the left in Fig. 4, where the walking bars 8 and 9 will be brought into position to thrust against the pavement. In order to move the rod 43 in either direction an operating hand lever 47 is shown as connected to a pin 48 secured to the center of the rod 43, the upper end 49 of the lever 47 being preferably located just in front of the seat of the car, so as to be readily accessible to the driver. The operating hand lever 47 may be pivoted at 50 to a bracket 51 mounted on the chassis frame in any suitable manner.

In order to keep the walking bars 8 and 9 in proper relative position in the loops 37 of the radius arms 38, springs 52 are preferably provided, which, as shown in Fig. 4, may be leaf springs, but obviously any usual or preferred form of spring may be used that will accomplish the purpose.

The device is operated as follows: When the car is driven into the parking space the front wheels will be brought into contact with the curb and the emergency brake thrown on. This, through the slide 31, will connect the rock shaft 15 through the link 20 with the engine, which by rotating the crank plate 23, will vibrate or rock the shaft 15 and in so doing rock the shafts 5, which in turn will vibrate the walking bars 8 and 9. For moving the rear end of the car inward toward the curb the upper end 49 of the hand lever 47 is moved in the direction of the curb and held firmly in that position, thereby bringing the corresponding walking device bars 8 and 9 into contact with the pavement. The member 7 is rocked rapidly by the engine power and the bars 8 and 9 are thereby rapidly thrust alternately against the pavement. By the thrust of the bars weight is taken off the adjacent wheel of the automobile. When the bars are in operative position they are disposed obliquely to the pavement transversely of the automobile. Therefore their thrust has a lateral reaction toward the adjacent wheel which moves the rear end of the automobile sidewise, sliding the other wheel on the pavement. The steps taken are quite short and quite rapid so that the shift of the automobile is almost continuous.

When it is desired to get out of a close parking space, the upper end 49 of the operating lever 47 is moved in a direction away from the curb. Thereby the outer pair of walking bars 8 and 9 are brought into contact with the pavement and the rear end of the car will be moved outwards away from the curb, so that the car may be readily backed out of the close parking space. In this way the car may be parked in a space very little longer than the car itself, and the parking or deparking may be accomplished with the least amount of effort and waste of time.

While the example shown and described illustrates the preferred arrangement, it will be understood that various modifications of the construction and specific details of the device may be made without departing from the spirit and scope of the invention.

What I claim is:

1. An automobile parking device comprising a pair of walking bars at each side of the center of the rear axle; means for supporting said walking bars on the axle housing for thrusting against the pavement; shafts extending longitudally of the car and provided with radial arms for the respective walking bars; means for rocking said shafts for alternately thrusting the bars of one pair against the pavement; means connected with the emergency brake lever for connecting and disconnecting said rocking means for operation by the engine of the automobile; and means under manual control of the operator for placing one or the other of said pairs of walking bars in position for thrust against the pavement.

2. An automobile parking device comprising a pair of thrust bars; means holding said bars disposed alongside of each other and pivotally supporting them on the automobile at the under side of one end thereof and adapting them to be swung downward to a position oblique to the pavement transversely of the automobile for thrusting engagement with the pavement and to be swung upward to an inoperative position clear of the pavement; and mechanism operable by power of the automobile engine to reciprocate said bars longitudinally to thrust them alternately against the pavement to shift the end of the automobile sidewise.

3. An automobile parking device comprising two pairs of thrust bars; means holding the bars of each pair disposed alongside of each other and pivotally supporting them at one end on the automobile at the under side thereof and providing thrust connections between the bars and the automobile and adapting the pairs to be selectively swung downward to operative pavement-engaging position oblique to the pavement transversely of the automobile and to be swung upward to inoperative position clear of the pavement, one pair being operatively disposable in a position inclined in one direction transversely of the car and the other pair being operatively disposable in a reversely inclined position; and power transmission mechanism between the automobile engine and said pairs of bars to reciprocate the bars longitudinally by engine power to thrust the bars which are in operative position alternately against the pavement to shift the automobile sidewise.

4. An automobile parking device comprising two pairs of thrust bars; means holding the bars of each pair disposed alongside of each other and pivotally supporting them at one end on the automobile at the under side of one end thereof and providing thrust connections between the bars and the automobile and adapting the pairs to be selectively swung downward to operative pavement engaging position oblique to the pavement transversely of the automobile and to be swung upward to inoperative position clear of the pavement, one pair being operatively disposable in a position inclined in one direction transversely of the car and the other pair being operatively disposable in a reversely inclined position; power transmission mechanism for said pairs of bars operatively connectible to the automobile engine to reciprocate the bars longitudinally by engine power to thrust the bars which are in operative position alternately against the pavement to shift the end of the automobile sidewise; means manually operable from the driver's seat to operatively connect said transmission mechanism to the engine; and a lever operable from the driver's seat and operatively connected to the two pairs of bars and rockable to the right to swing the appropriate pair of bars to operative position for shifting the end of the automobile to the right and rockable to the left to shift the other pair of bars to operative position to shift the end of the automobile to the left.

5. An automobile parking device comprising a pair of walking bars mounted at each side of the center of the rear axle; rock shafts provided with opposite radial arms to which the upper ends of the respective pairs of walking bars are pivotally connected; bearings on the axle housing for said shafts; controlling frames associated with each pair of bars for supporting the free ends of the bars out of contact with the pavement and for moving one or the other of the pairs of bars into operative contact with the pavement; means for rocking said shafts to alternately thrust the bars of one pair against the pavement for moving the rear end of the automobile toward or from the curb; manual means for placing one or the other of said pairs of bars in pavement thrusting position; and means connected with the emergency brake to connect and disconnect said rock shafts for rocking operation by the engine of the automobile.

6. An automobile parking device comprising a pair of walking bars mounted at each side of the center of the rear axle; rock shafts provided with opposite radial arms to which the upper ends of the respective pairs of walking bars are pivotally connected; bearings on the axle housing for said shafts; controlling frames associated with each pair of bars for supporting the free ends of the bars out of contact with the pavement and for moving one or the other of the pairs of bars into operative contact with the pavement each frame comprising a radius arm pivoted to one of the rock shafts and having a loop extending around the adjacent pair of thrust bars; a manual lever operatively connected to said frames to swing them to shift the thrust bars into and out of operative position; and means for rocking said shafts to alternately thrust the bars of one pair against the pavement for moving the rear end of the automobile toward or from the curb.

7. An automobile parking device comprising a pair of thrust bars; means mounting said bars alongside of each other on the automobile approximately at one end of the latter and adapting them to shift downward to an operative position in which the bars are similarly inclined to the pavement transversely of the automobile for thrusting engagement of the lower end of each of the bars with the pavement and to be shifted upward to an inoperative position clear of the pavement; and means to reciprocate said bars longitudinally to thrust them alternately against the pavement when the bars are lowered to operative position, to shift said end of the automobile sidewise.

WILLIAM H. HARLESS.